(12) United States Patent
Omi

(10) Patent No.: US 12,718,543 B2
(45) Date of Patent: Aug. 25, 2026

(54) TRAINING APPARATUS, TRAINING METHOD, RECORDING MEDIUM, AND CLASSIFYING APPARATUS

(71) Applicant: NEC Corporation, Tokyo (JP)

(72) Inventor: Yasuo Omi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 337 days.

(21) Appl. No.: 18/289,604

(22) PCT Filed: Oct. 12, 2022

(86) PCT No.: PCT/JP2022/038080
§ 371 (c)(1),
(2) Date: Nov. 6, 2023

(87) PCT Pub. No.: WO2024/079820
PCT Pub. Date: Apr. 18, 2024

(65) Prior Publication Data
US 2025/0078487 A1 Mar. 6, 2025

(51) Int. Cl.
*G06V 10/82* (2022.01)
*G06V 10/762* (2022.01)

(52) U.S. Cl.
CPC .......... *G06V 10/82* (2022.01); *G06V 10/7625* (2022.01)

(58) Field of Classification Search
CPC .. G06V 10/82; G06V 10/454; G06V 10/7625; G06V 10/774; G06V 2201/03;
(Continued)

(56) References Cited

U.S. PATENT DOCUMENTS

2016/0110584 A1* 4/2016 Remiszewski ......... G06V 20/69 382/133
2019/0147592 A1 5/2019 Yu et al.
(Continued)

FOREIGN PATENT DOCUMENTS

JP 2011-229413 A 11/2011
JP 2020-181486 A 11/2020
(Continued)

OTHER PUBLICATIONS

English translation of the International Search Report for PCT Application No. PCT/JP2022/038080, mailed on Dec. 27, 2022.
(Continued)

*Primary Examiner* — Sumati Lefkowitz
*Assistant Examiner* — Michael Adam Shariff
(74) *Attorney, Agent, or Firm* — Sughrue Mion, PLLC

(57) ABSTRACT

In order to train a machine learning model such that the machine learning model makes inferences with higher accuracy, a training apparatus includes at least one processor, the at least one processor carries out: an acquiring process of acquiring training images; and a training process of for training the machine learning model with use of the training images, and treats a training image belonging to a subclass different from a subclass to which an image of interest belongs and belonging to a class the same as a class to which the image of interest belongs, as a quasi-positive sample, and a training apparatus belonging to a class different from the class to which the image of interest belong, as a negative sample, to train the machine learning model such that the degree of similarity between features of the image of interest and features of the quasi-positive sample is higher than the degree of similarity between the features of the image of interest and features of the negative sample.

8 Claims, 5 Drawing Sheets

| Coarse classification | Intermediate classification | Fine classification |
|---|---|---|
| Benign cell | Normal cell | EC<br>Normal epithelial cell |
| | Normal cell with findings | IEC<br>Inflammatory EC |
| | | M<br>Macrophage |
| | Any other normal cell | LC<br>Lymphocyte |
| | | WBC<br>White blood cell |
| Malignant cell | Small cell cancer | S<br>Small cell cancer |
| | Non−small cell cancer | Ad<br>Adenocarcinoma |
| | | Sq<br>Squamous cell carcinoma |
| | | NS<br>Any other non−small cell cancer |

(58) Field of Classification Search
CPC .... G06V 2201/031; G06T 2207/20084; G06T 2207/20081; G06T 2207/30004; G06N 20/00
See application file for complete search history.

(56) References Cited

U.S. PATENT DOCUMENTS

| | | | | |
|---|---|---|---|---|
| 2022/0215253 | A1 | 7/2022 | Zeineh et al. | |
| 2022/0300761 | A1 * | 9/2022 | Zhang | G06N 3/0464 |
| 2024/0078785 | A1 * | 3/2024 | Mun | G06V 10/761 |

FOREIGN PATENT DOCUMENTS

| | | | |
|---|---|---|---|
| JP | 2021-096748 | A | 6/2021 |
| JP | WO2020/066257 | A1 | 8/2021 |
| JP | 2021-144675 | A | 9/2021 |
| WO | 2021/039339 | A1 | 3/2021 |
| WO | 2021/125305 | A1 | 6/2021 |
| WO | 2021/161901 | A1 | 8/2021 |

OTHER PUBLICATIONS

International Search Report for PCT Application No. PCT/JP2022/038080, mailed on Dec. 27, 2022.
Extended European Search Report for EP Application No. 22962040.6, dated on Mar. 6, 2026.
Rawat Jyoti et al: “FAB classification of acute leukemia using an ensemble of neural networks”, Evolutionary Intelligence, vol. 15, No. 1, Sep. 22, 2020.

* cited by examiner

FIG. 3

| Coarse classification | Fine classification |
| --- | --- |
| Benign cell | EC<br>Normal epithelial cell |
| | IEC<br>Inflammatory EC |
| | M<br>Macrophage |
| | LC<br>Lymphocyte |
| | WBC<br>White blood cell |
| Malignant cell | S<br>Small cell cancer |
| | Ad<br>Adenocarcinoma |
| | Sq<br>Squamous cell carcinoma |
| | NS<br>Any other non-small cell cancer |

FIG. 4

| Coarse classification | Intermediate classification | Fine classification |
| --- | --- | --- |
| Benign cell | Normal cell | EC<br>Normal epithelial cell |
| | Normal cell with findings | IEC<br>Inflammatory EC |
| | | M<br>Macrophage |
| | Any other normal cell | LC<br>Lymphocyte |
| | | WBC<br>White blood cell |
| Malignant cell | Small cell cancer | S<br>Small cell cancer |
| | Non-small cell cancer | Ad<br>Adenocarcinoma |
| | | Sq<br>Squamous cell carcinoma |
| | | NS<br>Any other non-small cell cancer |

2
Classifying apparatus
21
Control section
11
Acquiring section
12
Training section
12A
First training section
12B
Second training section
22
Classifying section
25
Storage section
26
Communicating section
27
Inputting section
28
Outputting section

TRAINING APPARATUS, TRAINING METHOD, RECORDING MEDIUM, AND CLASSIFYING APPARATUS

This application is a National Stage Entry of PCT/JP2022/038080 filed on Oct. 12, 2022, the contents of all of which are incorporated herein by reference, in their entirety.

TECHNICAL FIELD

The present invention relates to a training apparatus, a training method, and a recording medium for training a machine learning model (neural network) which carries out an image recognition task on the basis of features of an image, and to a classifying apparatus for classifying an image.

BACKGROUND ART

Methods for training a machine learning model have been disclosed, the machine learning model receiving an image as an input and outputting the result of inference according to the features of a subject contained in the image.

Patent Literature 1 discloses a method for using, as an input, a biological image such as an eye-fundus image and using, as a training data, data regarding the risk of developing a disease to train a machine learning model.

CITATION LIST

Patent Literature

[Patent Literature 1] International Publication No. WO 2021/039339

SUMMARY OF INVENTION

Technical Problem

In such a training method as disclosed in Patent Literature 1, the training is typically carried out such that the error between the output from a machine learning model and ground truth is minimized with use of cross entropy as a loss function. As a training method which can obtain invariant features less dependent on the type of an image recognition task than the foregoing method, contrastive learning has been known. In contrastive learning, a machine learning model is trained such that the inner product of the feature vector of a set of anchors, which are images of interest, and the feature vector of a set of positive samples is large and the inner product of the feature vector of the set of anchors and the feature vector of a set of negative samples is small.

Assume, as an example, that a machine learning model for estimating whether a cell specimen contained in an image as a subject is a benign cell or a malignant cell is trained by contrastive learning. In this case, an image in which a cell specimen is contained as a subject and the type of the cell specimen is the same as that of the cell contained as a subject in the image of an anchor is treated as a positive sample. An image in which the type of the cell specimen is different from that of the cell contained in the image of the anchor as a subject is treated as a negative sample. Further, it is desirable that images obtained by subjecting the image of the anchor to any data augmentation such as rotation, vertical or horizontal flip, scaling up or down, a change in hue, or cutting out be treated as the positive sample.

In this case, in a case where the type of a cell specimen contained in the image as a subject is different from the type of the benign (or malignant) cell contained in the image of the anchor as a subject, but the cell specimen is a benign (or malignant) cell, such a cell specimen is treated as the negative sample. This means that a case where a fine classification of cell (adenocarcinoma, squamous cell carcinoma) is different but the coarse classification of cell (benign or malignant) is the same is treated as the negative sample. Such a negative sample can have features which are partially common features shared by the cell specimen and the cell contained in the image of the anchor as a subject. However, with conventional contrastive learning, which does not consider such a case, there is a problem of being incapable of making inference accuracy higher.

An example aspect of the present invention has been made in view of the above problem, and an example object thereof is to provide a technique for training a machine learning model such that the machine learning model makes inferences with higher accuracy.

Solution to Problem

A training apparatus in accordance with an example aspect of the present invention is a training apparatus for training a machine learning model which generates features of an input image to carry out an image recognition task, and includes at least one processor, the at least one processor carries out: an acquiring process of acquiring a plurality of training images; and a training process of training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, and in the treating process, the at least one processor treats, with respect to an image of interest included in the plurality of training images, a training image belonging to a subclass the same as a subclass to which the image of interest belongs, as a positive sample, a training image belonging to a subclass different from the subclass to which the image of interest belongs and belonging to a class the same as a class to which the image of interest belongs, as a quasi-positive sample, and a training image belonging to a class different from the class to which the image of interest belongs, as a negative sample, to train the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample, and the subject contained in each of the plurality of training images is a cell specimen, classification into the plurality of classes is made according to whether the cell specimen is benign or malignant, and classification into the plurality of subclasses is made according to type of the cell specimen.

A training method in accordance with an example aspect of the present invention is a training method carried out by at least one processor included in a training apparatus for training a machine learning model which generates features of an input image to carry out an image recognition task, and includes: acquiring a plurality of training images; and training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, and in the training, with respect to an image of interest included in the plurality of training images, a training image belonging to a subclass the same as a subclass to which the image of interest belongs being treated as a positive sample, a training image belonging to a subclass different from the subclass to which the image of interest belongs and belonging to a class the same as a class to which the image of interest belongs being treated as a quasi-positive sample, a training image belonging to a class different from the class to which the image of interest belongs being treated as a negative sample, and the machine learning model being trained such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample, and the subject contained in each of the plurality of training images is a cell specimen, classification into the plurality of classes is made according to whether the cell specimen is benign or malignant, and classification into the plurality of subclasses is made according to type of the cell specimen.

A recording medium in accordance with an example aspect of the present invention is a computer-readable, non-transitory recording medium having recorded thereon program for causing a computer to function as a training apparatus for training a machine learning model which generates features of an input image to carry out an image recognition task, and the program causes the computer to carry out: an acquiring process of acquiring a plurality of training images; and a training process of training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, and in the training process, with respect to an image of interest included in the plurality of training images, a training image belonging to a subclass the same as a subclass to which the image of interest belongs is treated as a positive sample, a training image belonging to a subclass different from the subclass to which the image of interest belongs and belonging to a class the same as a class to which the image of interest belongs is treated as a quasi- positive sample, a training image belonging to a class different from the class to which the image of interest belongs is treated as a negative sample, and the machine learning model is trained such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample, and the subject contained in each of the plurality of training images is a cell specimen, classification into the plurality of classes is made according to whether the cell specimen is benign or malignant, and classification into the plurality of subclasses is made according to type of the cell specimen.

Advantageous Effects of Invention

With an example aspect of the present invention, it is possible to train a machine learning model such that the machine learning model makes inferences with high accuracy.

BRIEF DESCRIPTION OF DRAWINGS

FIG. 3 is a diagram illustrating an example of classes and subclasses in a second example embodiment of the present invention.

FIG. 4 is a diagram illustrating an example of classes, middle classes, and subclasses in the second example embodiment of the present invention.

EXAMPLE EMBODIMENTS

First Example Embodiment

The following description will discuss a first example embodiment of the present invention in detail, with reference to the drawings. The present example embodiment is basic to an example embodiment which will be described later.

(Outline of Training Apparatus 1)

A training apparatus 1 in accordance with the present example embodiment is a training apparatus for training a machine learning model which carries out an image recognition task of receiving an image as an input, generating features of the image, and outputting the result of recognizing the image on the basis of the feature. Examples of the image recognition task includes a classification task of determining to which of predefined labels a physical object contained in an image as a subject belongs. The machine learning model is, for example, a neural network.

In this case, each of a plurality of training images used by the training apparatus 1 for training the machine learning model belongs to one of a plurality of classes which are classifications appropriate to features of a subject contained in that training image. Further, the training image belongs to one of a plurality of subclasses obtained by further dividing each of the plurality of classes into a plurality of classifications appropriate to the features of the subject.

As an example, the training apparatus 1 trains the machine learning model by contrastive learning. In this case, the training apparatus 1 selects any image of interest (anchor) from among the training images. According to the class and the subclass to which the selected image of interest belongs and the class and the subclass to which each of the training images belongs, each of the training images are classified as one of a positive sample, a quasi-positive sample, and a negative sample, as described below.

With respect to the image of interest, a training image belonging to a subclass the same as the subclass to which the image of interest belongs is treated as a positive sample.

With respect to the image of interest, a training image belonging to a subclass different from the subclass to which the image of interest belongs and belonging to a class the same as the class to which the image of interest belongs is treated as a quasi-positive sample.

With respect to the image of interest, a training image belonging to a class different from the class to which the image of interest belongs is treated as a negative sample.

The training apparatus 1 trains the machine learning model according to whether a training image is a positive sample, a quasi-positive sample, or a negative sample. As an example, the training apparatus 1 trains the machine learning model with use of a loss function the contribution of which varies according to whether a training image is a positive sample, a quasi-positive sample, or a negative sample. A method of the training apparatus 1 training the machine learning model will be described later.

(Configuration of Training Apparatus 1)

Figure 1:
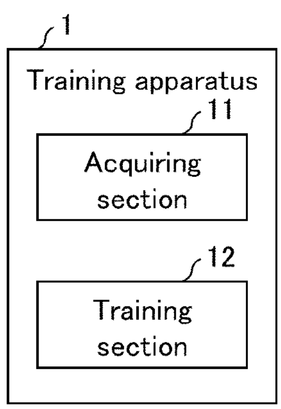
FIG. 1 is a block diagram illustrating a configuration of a training apparatus in accordance with a first example embodiment of the present invention.

A configuration of the training apparatus 1 in accordance with the present example embodiment is described with reference to FIG. 1. FIG. 1 is a block diagram illustrating a configuration of the training apparatus 1 in accordance with the present example embodiment.

The training apparatus 1 includes an acquiring section 11 and a training section 12, as illustrated in FIG. 1. In the present example embodiment, the acquiring section 11 and the training section 12 are components for implementing the acquiring means and the training means, respectively.

The acquiring section 11 acquires a plurality of training images. The acquiring section 11 supplies the training section 12 with the plurality of training images acquired.

The training section 12 trains the machine learning model with use of the plurality of training images acquired by the acquiring section 11.

Specifically, the training section 12 trains the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

As above, the training apparatus 1 in accordance with the present example embodiment is the training apparatus 1 for training a machine learning model which generates features of an input image to carry out an image recognition task, and a configuration employed therein is such that the acquiring section 11 and the training section 12 are included, the acquiring section 11 acquiring a plurality of training images, the training section 12 training the machine learning model with use of the plurality of training images acquired by the acquiring section 11.

Each of the training images belongs to one of a plurality of classes which are classifications appropriate to features of a subject contained in that training image, and belongs to one of a plurality of subclasses obtained by further dividing each of the plurality of classes into a plurality of classifications appropriate to the features of the subject.

The training section 12 treats, with respect to an image of interest included in the plurality of training images, a training image belonging to a subclass the same as a subclass to which the image of interest belongs, as a positive sample, a training image belonging to a subclass different from the subclass to which the image of interest belongs and belonging to a class the same as a class to which the image of interest belongs, as a quasi-positive sample, and a training image belonging to a class different from the class to which the image of interest belongs, as a negative sample, to train the machine learning model as follows.

The training section 12 trains the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

Therefore, the training apparatus 1 in accordance with the present example embodiment treats, as a quasi-positive sample, a training image belonging to a subclass different from the subclass to which the image of interest belongs and belonging to a class the same as the subclass to which the image of interest belongs, to train a machine learning model such that the degree of similarity between the features of the image of interest and features of the quasi-positive sample is higher than the degree of similarity between the features of the image of interest and the features of the negative sample. Thus, the training apparatus 1 in accordance with the present example embodiment, which trains the machine learning model in consideration of the quasi-positive sample, provides an example advantage of being capable of training the machine learning model such that the makes inferences with higher accuracy makes inferences with higher accuracy.

(Flow of training method)

Figure 2:
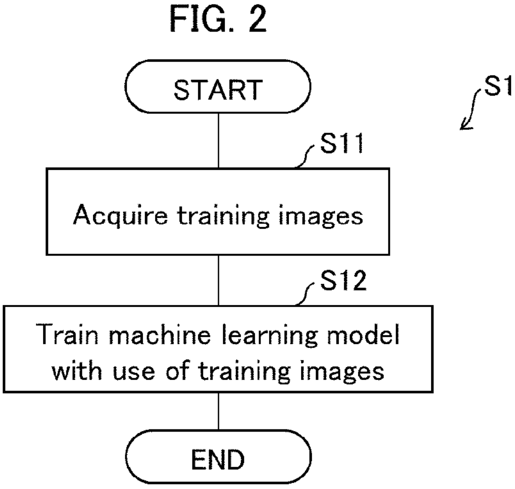
FIG. 2 is a flowchart illustrating a flow of a training method in accordance with the first example embodiment of the present invention.

A flow of a training method S1 in accordance with the present example embodiment will be described with reference to FIG. 2. FIG. 2 is a flowchart illustrating a flow of the training method S1 in accordance with the present example embodiment.

(Step S11)

In step S11, the acquiring section 11 acquires a plurality of training images. The acquiring section 11 supplies the training section 12 with the plurality of training images acquired.

(Step S12)

In step S12, the training section 12 trains the machine learning model with use of the plurality of training images acquired by the acquiring section 11.

Specifically, in step S12, the training section 12 trains the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

As above, the training method S1 in accordance with the present example embodiment is the training method S1 carried out by the training apparatus 1 for training a machine learning model which generates features of an input image to carry out an image recognition task, and a configuration employed therein is such that in step S11, the acquiring section 11 acquires a plurality of training images, and in step S12, the training section 12 trains the machine learning model with use of the plurality of training images acquired by the acquiring section 11.

In step S12, the training section 12 trains the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

Therefore, the training method S1 in accordance with the present example embodiment provides the same example advantage that is provided by the training apparatus 1 described above.

Second Example Embodiment

The following description will discuss a second example embodiment of the present invention in detail, with reference to the drawings. A component that has the same function as a component described in the first example embodiment is assigned the same reference sign, and the description thereof is omitted where appropriate.

Outline of Classifying Apparatus 2

A classifying apparatus 2 in accordance with the present example embodiment uses a second machine learning model which includes a first machine learning model having been trained with use of a first loss function (which will be described later) and which has been trained with use of a second loss function (cross entropy), to classify an image containing a subject as one of the classes or one of the subclasses. The classifying apparatus 2 can be used for, for example, cytological diagnosis in rapid on-site evaluation (ROSE).

A training image belongs to one of a plurality of classes which are classifications appropriate to features of a subject contained in the training image. Further, the training image belongs to one of a plurality of subclasses obtained by further dividing each of the plurality of classes into a plurality of classifications appropriate to the features of the subject. An example of the classes and subclasses are illustrated in FIG. 3. FIG. 3 is a diagram illustrating an example of the classes and subclasses in the present example embodiment.

FIG. 3 shows that classification into the classes is performed according to whether the cell specimen contained in an image as a subject is benign or malignant. FIG. 3 also shows that classification into the subclasses is performed according to the type of a cell specimen contained in an image as a subject. In FIG. 3, for example, the class "benign cell" is divided into classifications which are a plurality of subclasses "EC: normal epithelial cell", "IEC: inflammatory EC", "M: macrophage", "LC: lymphocyte", and "WBC: white blood cell".

In addition, the training image may belong to one of a plurality of middle classes which are obtained by dividing each of the classes into a plurality of classifications and each of which has one or more of the subclasses grouped together. An example of the example illustrated in FIG. 3 being further divided into classifications which are the middle classes is illustrated in FIG. 4. FIG. 4 is a diagram illustrating an example of the classes, middle classes, and subclasses in the present example embodiment.

In FIG. 4, for example, the class "benign cell" is divided into classifications which are three middle classes "normal cell", "normal cell with findings", and "any other normal cell". In addition, in FIG. 4, the middle class "normal cell" has the subclass "EC: normal epithelial cell" grouped, and the middle class "normal cell with findings" has the subclasses "IEC: inflammatory EC" and "M: macrophage" grouped together.

The classifying apparatus 2 carries out training of the first machine learning model and training of the second machine learning model. In other words, the classifying apparatus 2 also serves as a training apparatus. Details of processes of the classifying apparatus 2 carrying out the training of the first machine learning model and the training of the second machine learning model will be described later.

(Configuration of Classifying Apparatus 2)

Figures 5, 6:
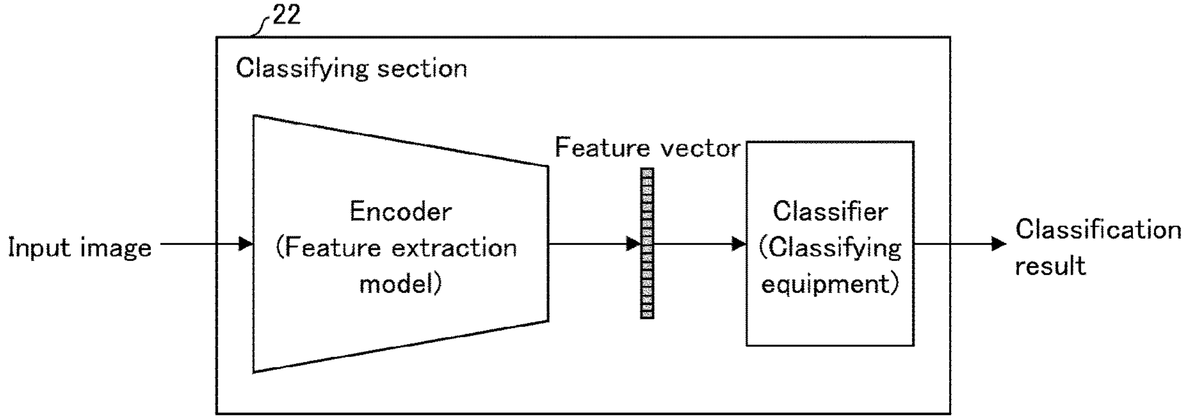
FIG. 5 is a block diagram illustrating a configuration of a training apparatus in accordance with the second example embodiment of the present invention.
FIG. 6 is a block diagram illustrating a configuration of a classifying section 22 in accordance with the second example embodiment of the present invention.

FIG. 5 is a block diagram illustrating a configuration of the classifying apparatus 2 in accordance with the present example embodiment. The classifying apparatus 2 includes a control section 21, a storage section 25, communicating section 26, an inputting section 27, and an outputting section 28, as illustrated in FIG. 5.

In the storage section 25, data referred to by the control section 21 is stored. Examples of the data stored in the storage section 25 includes training images and labeled training data (training labels).

The communicating section 26 is a communicating module for communicating with another apparatus which is connected to the classifying apparatus 2 via a network. As an example, the communicating section 26 receives a training image and outputs the result of classification.

The inputting section 27 is an interface via which data is acquired from another apparatus which is connected to the classifying apparatus 2. As an example, the inputting section 27 acquires a training image.

The outputting section 28 is an interface via which data is outputted to another apparatus which is connected to the classifying apparatus 2. As an example, the outputting section 28 outputs the result of classification.

(Control Section 21)

The control section 21 controls each component included in the classifying apparatus 2. The control section 21 includes the acquiring section 11, the training section 12, and the classifying section 22, as illustrated in FIG. 5. In the present example embodiment, the acquiring section 11, the training section 12, and the classifying section 22 are components for implementing the acquiring means, the training means, and the classifying means, respectively.

The acquiring section 11 acquires data via the communicating section 26 or the inputting section 27. Examples of the data acquired by the acquiring section 11 include training images and images to be subjected to classification. The acquiring section 11 stores acquired data in the storage section 25.

The training section 12 trains the first machine learning model with use of the first loss function and trains the second machine learning model with use of the second loss function. The first machine learning model is an Encoder (feature extraction model) which receives an input image as an input and generates features of the input image. The first machine learning model is used as a preliminary learning model of the second machine learning model. The second machine learning model has a Classifier (classifying equipment, second group of layers) connected to the Encoder (first group of layers), which is the first machine learning model. The training section 12 includes a first training section 12A and a second training section 12B, as illustrated in FIG. 5. In the present example embodiment, the first training section 12A and the second training section 12B are components for implementing the training means.

The first training section 12A trains the first machine learning model with use of a plurality of training images stored in the storage section 25 and respective training labels corresponding to the plurality of training images. As described above, the first machine learning model is the Encoder (feature extraction model) and is used as a preliminary learning model of the second machine learning model.

Details of processes of the first training section 12A training the first machine learning model will be described later.

The second training section 12B trains the second machine learning model with use of the plurality of training images and the respective training labels stored in the storage section 25, the respective training labels corresponding to the results of classifying each of the plurality of training images as one of the classes or one of the subclasses. As described above, the second machine learning model has the Classifier (classifying equipment) connected to the Encoder, which is the first machine learning model. Known methods are used as a method of the second training section 12B training the second machine learning model and as the loss function (second loss function). Examples of such known methods include a method of using a cross entropy to minimize the error between the output data from the second machine learning model and the training label. The second training section 12B mainly trains the Classifier, and if necessary, may train the Encoder to make fine adjustment of the Encoder.

The classifying section 22 inputs an image to the second machine learning model to classify the inputted image as one of the classes or one of the subclasses.

An example of the configuration of the classifying section 22 will be described with reference to FIG. 6. FIG. 6 is a block diagram illustrating a configuration of the classifying section 22 in accordance with the present example embodiment.

The classifying section 22 includes the first machine learning model, which is an Encoder (feature extraction model), and the second machine learning model, which has the Classifier (classifying equipment) connected to the Encoder (first machine learning model), as illustrated in FIG. 6.

The first machine learning model receives, as an input, an input image containing a subject, and outputs features (feature vector) optimized with use of the first loss function.

The second machine learning model includes the Encoder and the Classifier which is connected to the Encoder and which receives, as an input, the features of the input image outputted from the Encoder to classify the input image as one of the classes or one of the subclasses. The second machine learning model outputs, as the result of classification, the class or the subclass under which the Classifier has classified the input image.

(Process 1 of Training First Machine Learning Model)

The first training section 12A selects any image of interest (anchor) from among a plurality of training images. According to the class or subclass to which the selected image of interest belongs and the class or subclass to which each of the plurality of training images belongs, that training image is classified as one of positive sample, quasi-positive sample, and negative sample, as indicated below.

With respect to the image of interest, a training image belonging to a subclass the same as the subclass to which the image of interest belongs is treated as a positive sample.

With respect to the image of interest, a training image belonging to a subclass different from the subclass to which the image of interest belongs and belonging to a class the same as the class to which the image of interest belongs is treated as a quasi-positive sample.

With respect to the image of interest, a training image belonging to a class different from the class to which the image of interest belongs is treated as a negative sample.

It is desirable that the first training section 12A add, to the positive samples, a data augmentation image obtained by data augmentation of the image of interest. Examples of the data augmentation image includes: an image obtained by rotating the image of interest; an image obtained by moving the subject contained in the image of interest; an image obtained by scaling up or down the subject contained in the image of interest; an image obtained by flipping the image of interest in at least one of vertical and horizontal directions; an image cut out from the image of interest; and an image obtained by changing the hue, saturation, and lightness of the image of interest.

The first training section 12A trains the first machine learning model such that features of the image of interest and features of the positive sample have a high degree of similarity to each other (i.e., the inner product of the feature vectors), the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

As an example, the first training section 12A trains the first machine learning model such that the value of Formula (1) below, which is a loss function, is small.

$$L = \sum_{i \in I} L_i = \sum_{i \in I} \frac{-1}{|P(i)|} \sum_{p \in P(i)} \log \frac{\exp(z_i \cdot z_p / \tau)}{W_n \sum_{n \in N(i)} \exp\left(z_i \cdot \frac{z_n}{\tau}\right) + W_q \sum_{q \in Q(i)} \exp\left(z_i \cdot \frac{z_q}{\tau}\right)} \quad (1)$$

I: a set of images of interest i: a selected image of interest $z_i$: a feature vector of the image of interest P(i): a set of positive samples p: a positive sample $z_p$: a feature vector of the positive sample N(i): a set of images which are negative samples n: a negative sample $z_n$: a feature vector of the negative sample $W_n$: a weighting factor assigned to the negative sample Q(i): a set of quasi-positive samples q: a quasi-positive sample $z_q$: a feature vector of the quasi-positive sample $W_q$: a weighting factor assigned to the quasi-positive sample $\cdot$: an inner product $\tau$: a temperature parameter (constant)

In order for the value of Formula (1), which is a loss function, to be small, the first training section 12A trains the first machine learning model such that the inner product of the feature vector of the image of interest and the feature vector of the positive sample is large. In addition, the first training section 12A trains the first machine learning model such that the inner product of the feature vector of the image of interest and the feature vector of the quasi-positive sample is small. In addition, the first training section 12A trains the first machine learning model such that the inner product of the feature vector of the image of interest and the feature vector of the negative sample is small.

Therefore, in Formula (1), the features are represented with use of the feature vector, and the degree of similarity between the feature vector of the image of interest and the feature vector of each of the positive sample, the quasi-positive sample, and the negative sample is based on the inner product of the feature vector of the image of interest and the feature vector of a corresponding one of the positive sample, the quasi-positive sample, and the negative sample.

Furthermore, in Formula (1), the weighting factor $W_q$ assigned to the quasi-positive sample is preferably set so as to be greater than the weighting factor $W_n$ assigned to the negative sample. In this case, the value of Formula (1) more significantly varies depending on the inner product of the feature vector of the image of interest and the feature vector of the quasi-positive sample than depending on the inner product of the feature vector of the image of interest and the feature vector of the negative sample. In other words, it is possible for the first training section 12A to train the first machine learning model such that the degree of similarity between the features of the image of interest and the features of the quasi-positive sample is higher than the degree of similarity between the features of the image of interest and the features of the negative sample.

(Process 2 of Training First Machine Learning Model)

As described above, the training image may belong to one of the plurality of middle classes which are obtained by dividing each of the classes into a plurality of classifications and each of which has one or more of the subclasses grouped together. In this case, each of the training image is classified as one of the above-described positive sample, quasi-positive sample, and negative sample, and in addition, the training image that is the quasi-positive sample is classified as one of first quasi-positive sample and second quasi-positive sample, as indicated below.

A training image which is the quasi-positive sample and which belongs to a middle class the same as the middle class to which the image of interest belongs is treated as the first quasi-positive sample.

A training image which is the quasi-positive sample and which belongs to a middle class different from the middle class to which the image of interest belongs is treated as the second quasi-positive sample.

The first training section 12A trains the first machine learning model such that the degree of similarity between the features of the image of interest and the features of the first quasi-positive sample is higher than the degree of similarity between the features of the image of interest and the features of the second quasi-positive sample. The process of the first training section 12A training the first machine learning model with use of the positive sample and the negative sample is as described above.

As an example, the first training section 12A trains the first machine learning model such that the value of Formula (2) below, which is a loss function, is small.

$$L = \sum_{i \in I} L_i = \sum_{i \in I} \frac{-1}{|P(i)|} \sum_{p \in P(i)} \log \frac{\exp\left(z_i \cdot \frac{z_p}{\tau}\right)}{W_n \sum_{n \in N(i)} \exp\left(z_i \cdot \frac{z_n}{\tau}\right) + W_{q1} \sum_{q \in Q(i)} \exp\left(z_i \cdot \frac{z_q}{\tau}\right) + W_{q2} \sum_{q \in Q(i)} \exp\left(z_i \cdot \frac{z_q}{\tau}\right)} \tag{2}$$

I: a set of images of interest i: a selected image of interest $z_i$: a feature vector of the image of interest P(i): a set of positive samples p: a positive sample $z_p$: a feature vector of the positive sample N(i): a set of images which are negative samples n: a negative sample $z_n$: a feature vector of the negative sample $W_n$: a weighting factor assigned to the negative sample Q(i): a set of quasi-positive samples q1: a first quasi-positive sample $z_{q1}$: a feature vector of the first quasi-positive sample $W_{q1}$: a weighting factor assigned to the first quasi-positive sample q2: a second quasi-positive sample $z_{q2}$: a feature vector of the second quasi-positive sample $W_{q2}$: a weighting factor assigned to the second quasi-positive sample:

$\cdot$: an inner product $\tau$: a temperature parameter (constant)

In order for the value of Formula (2), which is a loss function, to be small, the first training section 12A trains the first machine learning model such that the inner product of the feature vector of the image of interest and the feature vector of the first quasi-positive sample is small. Furthermore, the first training section 12A trains the first machine learning model such that the inner product of the feature vector of the image of interest and the feature vector of the second quasi-positive sample is small. As described above, as to the positive sample, the first training section 12A trains the first machine learning model such that the inner product of the feature vector of the image of interest and the feature vector of the positive sample is large. As to the negative sample, the first training section 12A trains the first machine learning model such that the inner product of the feature vector of the image of interest and the feature vector of the negative sample is small.

Furthermore, in Formula (2), the weighting factor $W_{q1}$ assigned to the first quasi-positive sample is preferably set so as to be greater than the weighting factor $W_{q2}$ assigned to the second quasi-positive sample. In this case, the value of Formula (2) more significantly varies depending on the inner product of the feature vector of the image of interest and the feature vector of the first quasi-positive sample than depending on the inner product of the feature vector of the image of interest and the feature vector of the second quasi-positive sample. In other words, it is possible for the first training section 12A to train the first machine learning model such that the degree of similarity between the features of the image of interest and the features of the first quasi-positive sample is higher than the degree of similarity between the features of the image of interest and the features of the second quasi-positive sample.

(Example Advantage of Classifying Apparatus 2)

As above, a configuration employed in the classifying apparatus 2 in accordance with the present example embodiment is such that each of the training images further belongs to one of a plurality of middle classes which are obtained by dividing each of the plurality of classes into a plurality of classifications and each of which has one or more of the subclasses grouped together. The classifying apparatus 2 in accordance with the present example embodiment treats, as a first quasi-positive sample, a training image which is the quasi-positive sample and which belongs to a middle class the same as a middle class to which the image of interest belongs and treats, as a second quasi-positive sample, a training image which is the quasi-positive sample and which belongs to a middle class different from the middle class to which the image of interest belongs, to train a machine learning model such that the degree of similarity between the features of the image of interest and the features of the first quasi-positive sample is higher than the degree of similarity between the features of the image of interest and the features of the second quasi-positive sample.

Therefore, the classifying apparatus 2 in accordance with the present example embodiment trains a machine learning model in consideration of the first quasi-positive sample and the second quasi-positive sample, which are further classifications of the quasi-positive sample. This provides an example advantage of being capable of training a machine learning model such that the machine learning model makes inferences with higher accuracy.

[Software Implementation Example]

Some or all of the functions of each of the training apparatus 1 and the classifying apparatus 2 may be implemented by hardware such as an integrated circuit (IC chip), or may be implemented by software.

Figure 7:
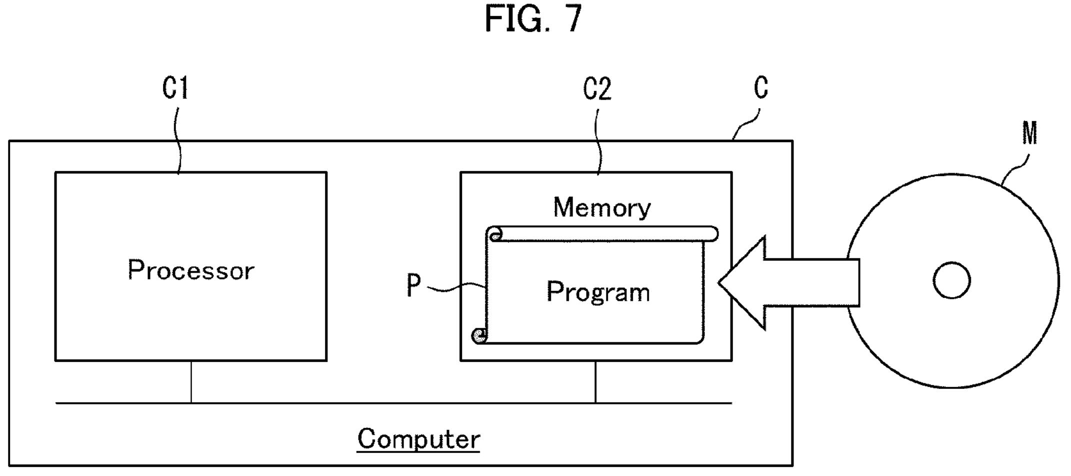
FIG. 7 is a block diagram illustrating an example hardware configuration of the training apparatus in accordance with the example embodiments of the present invention.

In the latter case, each of the training apparatus 1 and the classifying apparatus 2 are provided by, for example, a computer that executes instructions of a program that is software implementing the foregoing functions. An example (hereinafter, computer C) of such a computer is illustrated in FIG. 7. The computer C includes at least one processor C1 and at least one memory C2. The memory C2 has recorded thereon a program P for causing the computer C to operate as the training apparatus 1 and the classifying apparatus 2. The processor C1 of the computer C retrieves the program P from the memory C2 and executes the program P, so that the functions of the training apparatus 1 and the classifying apparatus 2 are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded when executed and in which various kinds of data are temporarily stored. The may computer C further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted via a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can be described as, but not limited to, the following supplementary notes.

(Supplementary Note 1)

A training apparatus for training a machine learning model which generates features of an input image to carry out an image recognition task, the training apparatus including: an acquiring means for acquiring a plurality of training images; and a training means for training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, the training means treating, with respect to an image of interest included in the plurality of training images, a training image belonging to a subclass the same as a subclass to which the image of interest belongs, as a positive sample, a training image belonging to a subclass different from the subclass to which the image of interest belongs and belonging to a class the same as a class to which the image of interest belongs, as a quasi-positive sample, and a training image belonging to a class different from the class to which the image of interest belongs, as a negative sample, to train the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

(Supplementary Note 2)

The training apparatus described in supplementary note 1, in which the features are represented with use of a feature vector, a feature vector of the image of interest and a feature vector of each of the positive sample, the quasi-positive sample, and the negative sample have a degree of similarity to each other which is based on an inner product of the feature vector of the image of interest and the feature vector of a corresponding one of the positive sample, the quasi-positive sample, and the negative sample.

(Supplementary Note 3)

The training apparatus described in supplementary note 1 or 2, in which: each of the training images further belongs to one of a plurality of middle classes which are obtained by dividing each of the plurality of classes into a plurality of classifications and each of which has one or more of the subclasses grouped together; and the training means further treats, a training image which is the quasi-positive sample and which belongs to a middle class the same as a middle class to which the image of interest belongs, as a first quasi-positive sample, and a training image which is the quasi-positive sample and which belongs to a middle class different from the middle class to which the image of interest belongs, as a second quasi-positive sample, to train the machine learning model such that the features of the image of interest and features of the first quasi-positive sample have a higher degree of similarity to each other than the features of the image of interest and features of the second quasi-positive sample have.

(Supplementary Note 4)

The training apparatus described in any one of supplementary notes 1 to 3, in which: the subject contained in each of the plurality of training images is a cell specimen; and classification into the plurality of classes is made according to whether the cell specimen is benign or malignant, and classification into the plurality of subclasses is made according to type of the cell specimen.

(Supplementary Note 5)

The training apparatus described in any one of supplementary notes 1 to 4, in which the training means further treats a data augmentation image obtained by data augmentation of the image of interest, as a positive sample.

(Supplementary Note 6)

The training apparatus described in any one of supplementary notes 1 to 5, in which the machine learning model includes: a first group of layers which receives the input image as an input and generates the features of the input image; and a second group of layers which is connected to the first group of layers and which receives the features of the input image as an input and which classifies the input image as one of the plurality of classes or one of the plurality of subclasses, and the training means further uses a plurality of training images and training labels corresponding to respective results of classifying each of the plurality of training images as one of the plurality of classes or one of the plurality of subclasses, to train the machine learning model.

(Supplementary Note 7)

A classifying apparatus including a classifying means for inputting an image containing a subject to the machine learning model trained by the training apparatus described in any one of supplementary notes 1 to 6, to classify the image as one of the plurality of classes or one of the plurality of subclasses.

(Supplementary Note 8)

A training method carried out by a training apparatus for training a machine learning model which generates features of an input image to carry out an image recognition task, the training method including: acquiring a plurality of training images; and training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, in the training, with respect to an image of interest included in the plurality of training images, a training image belonging to a subclass the same as a subclass to which the image of interest belongs being treated as a positive sample, a training image belonging to a subclass different from the subclass to which the image of interest belongs and belonging to a class the same as a class to which the image of interest belongs being treated as a quasi-positive sample, a training image belonging to a class different from the class to which the image of interest belongs being treated as a negative sample, and the machine learning model being trained such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

(Supplementary Note 9)

A program for causing a computer to function as a training apparatus for training a machine learning model which generates features of an input image to carry out an image recognition task, the program causing the computer to function as: an acquiring means for acquiring a plurality of training images; and a training means for training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, the training means treating, with respect to an image of interest included in the plurality of training images, a training image belonging to a subclass the same as a subclass to which the image of interest belongs, as a positive sample, a training image belonging to a subclass different from the subclass to which the image of interest belongs and belonging to a class the same as a class to which the image of interest belongs, as a quasi-positive sample, and a training image belonging to a class different from the class to which the image of interest belongs, as a negative sample, to train the machine learning model such that features of the image of interest and features of the positive sample have a high degree of similarity to each other, the features of the image of interest and features of the quasi-positive sample have a low degree of similarity to each other the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

[Additional Remark 3]

The whole or part of the example embodiments disclosed above can further be expressed as follows.

A training apparatus for training a machine learning model which generates features of an input image to carry out an image recognition task, the training apparatus including at least one processor, the at least one processor carrying out: an acquiring process of acquiring a plurality of training images; and a training means process of training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, in the training process, the at least one processor treating, with respect to an image of interest included in the plurality of training images, a training image belonging to a subclass the same as a subclass to which the image of interest belongs, as a positive sample, a training image belonging to a subclass different from the subclass to which the image of interest belongs and belonging to a class the same as a class to which the image of interest belongs, as a quasi-positive sample, and a training image belonging to a class different from the class to which the image of interest belongs, as a negative sample, to train the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample.

This training apparatus may further include a memory, and this memory may have stored therein a program for causing the at least one processor to carry out the acquiring process and the training process. In addition, this program may be recorded on a computer-readable, non-transitory, and tangible recording medium.

REFERENCE SIGNS LIST

1: Training apparatus
2: Classifying apparatus
11: Acquiring section
12: Training section
12A: First training section
12B: Second training section
22: Classifying section

What is claimed is:

1. A training apparatus for training a machine learning model which generates features of an input image to carry out an image recognition task, the training apparatus comprising at least one processor, the at least one processor carrying out:

acquiring a plurality of training images; and training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, in the training, the at least one processor treating, with respect to an image of interest included in the plurality of training images, a training image belonging to a subclass the same as a subclass to which the image of interest belongs, as a positive sample, a training image belonging to a subclass different from the subclass to which the image of interest belongs and belonging to a class the same as a class to which the image of interest belongs, as a quasi-positive sample, and a training image belonging to a class different from the class to which the image of interest belongs, as a negative sample, to train the machine learning model such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample, the subject contained in each of the plurality of training images being a cell specimen, classification into the plurality of classes being made according to whether the cell specimen is benign or malignant, and classification into the plurality of subclasses being made according to type of the cell specimen, wherein:

each of the training images further belongs to one of a plurality of middle classes which are obtained by dividing each of the plurality of classes into a plurality of classifications and each of which has one or more of the subclasses grouped together; and in the training, the at least one processor further treats, a training image which is the quasi-positive sample and which belongs to a middle class the same as a middle class to which the image of interest belongs, as a first quasi-positive sample, and a training image which is the quasi-positive sample and which belongs to a middle class different from the middle class to which the image of interest belongs, as a second quasi-positive sample, to train the machine learning model such that the features of the image of interest and features of the first quasi-positive sample have a higher degree of similarity to each other than the features of the image of interest and features of the second quasi-positive sample have.

2. The training apparatus according to claim 1, wherein the features are represented with use of a feature vector, a feature vector of the image of interest and a feature vector of each of the positive sample, the quasi-positive sample, and the negative sample have a degree of similarity to each other which is based on an inner product of the feature vector of the image of interest and the feature vector of a corresponding one of the positive sample, the quasi-positive sample, and the negative sample.

3. The training apparatus according to claim 1, wherein in the training, the at least one processor further treats a data augmentation image obtained by data augmentation of the image of interest, as a positive sample.

4. The training apparatus according to claim 1, wherein the machine learning model includes:

a first group of layers which receives the input image as an input and generates the features of the input image; and a second group of layers which is connected to the first group of layers and which receives the features of the input image as an input and which classifies the input image as one of the plurality of classes or one of the plurality of subclasses, and in the training, the at least one processor further uses the plurality of training images and training labels corresponding to respective results of classifying each of the plurality of training images as one of the plurality of classes or one of the plurality of subclasses, to train the machine learning model.

5. A classifying apparatus comprising at least one processor, the at least one processor carrying out inputting an image containing a subject to the machine learning model trained by the training apparatus according to claim 1, to classify the image as one of the plurality of classes or one of the plurality of subclasses.

6. The classifying apparatus according to claim 5, wherein in the classifying, the at least one processor calculates optimized features from the image containing the subject, to use the optimized features to classify the image as one of the plurality of classes or one of the plurality of subclasses.

7. A training method carried out by at least one processor included in a training apparatus for training a machine learning model which generates features of an input image to carry out an image recognition task, the training method comprising:

acquiring a plurality of training images; and training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, in the training, with respect to an image of interest included in the plurality of training images, a training image belonging to a subclass the same as a subclass to which the image of interest belongs being treated as a positive sample, a training image belonging to a subclass different from the subclass to which the image of interest belongs and belonging to a class the same as a class to which the image of interest belongs being treated as a quasi-positive sample, a training image belonging to a class different from the class to which the image of interest belongs being treated as a negative sample, and the machine learning model being trained such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample, the subject contained in each of the plurality of training images being a cell specimen, classification into the plurality of classes being made according to whether the cell specimen is benign or malignant, and classification into the plurality of subclasses being made according to type of the cell specimen, wherein:

each of the training images further belongs to one of a plurality of middle classes which are obtained by dividing each of the plurality of classes into a plurality of classifications and each of which has one or more of the subclasses grouped together; and in the training, the at least one processor further treats, a training image which is the quasi-positive sample and which belongs to a middle class the same as a middle class to which the image of interest belongs, as a first quasi-positive sample, and a training image which is the quasi-positive sample and which belongs to a middle class different from the middle class to which the image of interest belongs, as a second quasi-positive sample, to train the machine learning model such that the features of the image of interest and features of the first quasi-positive sample have a higher degree of similarity to each other than the features of the image of interest and features of the second quasi-positive sample have.

8. A computer-readable, non-transitory recording medium having recorded thereon a program for causing a computer to function as a training apparatus for training a machine learning model which generates features of an input image to carry out an image recognition task, the program causing the computer to carry out:

acquiring process of acquiring a plurality of training images; and training process of training the machine learning model with use of the plurality of training images, each of the plurality of training images belonging to one of a plurality of classes which are classifications appropriate to features of a subject contained in that training image, and belonging to one of a plurality of subclasses obtained by further dividing each of the plurality of classes into a plurality of classifications appropriate to the features of the subject, in the training, with respect to an image of interest included in the plurality of training images, a training image belonging to a subclass the same as a subclass to which the image of interest belongs, being treated as a positive sample, a training image belonging to a subclass different from the subclass to which the image of interest belongs and belonging to a class the same as a class to which the image of interest belongs, being treated as a quasi-positive sample, a training image belonging to a class different from the class to which the image of interest belongs, being treated as a negative sample, and the machine learning model being trained such that features of the image of interest and features of the positive sample have a high degree of similarity to each other, the features of the image of interest and features of the quasi-positive sample have a low degree of similarity to each other, the features of the image of interest and features of the negative sample have a low degree of similarity to each other, and the degree of similarity between the features of the image of interest and the features of the quasi-positive sample is higher than the degree of similarity between the features of the image of interest and the features of the negative sample, the subject contained in each of the plurality of training images being a cell specimen, classification into the plurality of classes being made according to whether the cell specimen is benign or malignant, and classification into the plurality of subclasses being made according to type of the cell specimen, wherein:

each of the training images further belongs to one of a plurality of middle classes which are obtained by dividing each of the plurality of classes into a plurality of classifications and each of which has one or more of the subclasses grouped together; and in the training, the at least one processor further treats, a training image which is the quasi-positive sample and which belongs to a middle class the same as a middle class to which the image of interest belongs, as a first quasi-positive sample, and a training image which is the quasi-positive sample and which belongs to a middle class different from the middle class to which the image of interest belongs, as a second quasi-positive sample, to train the machine learning model such that the features of the image of interest and features of the first quasi-positive sample have a higher degree of similarity to each other than the features of the image of interest and features of the second quasi-positive sample have.

* * * * *